United States Patent
von Fay et al.

(10) Patent No.: US 6,541,106 B1
(45) Date of Patent: Apr. 1, 2003

(54) HYDROPHILIC POLYURETHANE IMPREGNATED RUBBER FOR SEALING WATER LEAKS

(75) Inventors: Kurt F. von Fay, Littleton, CO (US); William F. Kepler, Golden, CO (US); Alice I. Comer, Littleton, CO (US)

(73) Assignee: The United States of America as represented by the Secretary of the Interior, Washington, DC (US)

( * ) Notice: Subject to any disclaimer, the term of this patent is extended or adjusted under 35 U.S.C. 154(b) by 0 days.

(21) Appl. No.: 09/660,483

(22) Filed: Sep. 12, 2000

(51) Int. Cl.$^7$ ............... B32B 3/06; F16L 55/18
(52) U.S. Cl. ............... 428/306.6; 428/304.4; 428/308.4; 138/97; 138/98; 138/99
(58) Field of Search ............... 428/306.6, 308.4, 428/304.4; 138/97, 98, 99

(56) References Cited

U.S. PATENT DOCUMENTS

| | | | | |
|---|---|---|---|---|
| 4,041,665 A | * | 8/1977 | de Munck | 52/396 |
| 5,130,176 A | * | 7/1992 | Baerveldt | 428/192 |
| 5,554,687 A | * | 9/1996 | Yang | 525/63 |
| 5,965,251 A | * | 10/1999 | Namura et al. | 428/318.4 |
| 5,992,858 A | * | 11/1999 | Teaster | 277/650 |
| 6,287,698 B1 | * | 9/2001 | Zhu et al. | 428/424.4 |

* cited by examiner

*Primary Examiner*—Terrel Morris
*Assistant Examiner*—Hai Vo
(74) *Attorney, Agent, or Firm*—Ross F. Hunt, Jr.

(57) ABSTRACT

A material provided for sealing leaks in water conveyance systems includes a porous hydrophilic rubber impregnated with a water reactive polyurethane resin. When the material comes into contact with water, the rubber and polyurethane swell and this results in increased adhesion and improved sealing.

17 Claims, No Drawings

HYDROPHILIC POLYURETHANE IMPREGNATED RUBBER FOR SEALING WATER LEAKS

BACKGROUND OF THE INVENTION

1. Field of the Invention

The present invention relates to materials used to stop low to high flow water leaks associated with water conveyance and control structures located in hard to access areas and, more particularly, to hydrophilic polyurethane impregnated rubber adapted for this purpose.

2. Related Art

Water conveyance systems typically include large concrete and steel pipes for carrying water to power generators, pumps and water users. Pipes used with water conveyance systems are subject to corrosion and deterioration. Over time, such corrosion and deterioration causes leaks to be formed in the pipes. A number of materials have been developed to repair leaks in conveyance system pipes. However, the repair materials and methods developed in the prior art have not performed satisfactorily for a number of reasons. More specifically, these materials have either failed to adequately seal the leak, are washed away before they are cured, or have become dis-bonded prematurely. Even when these prior art materials stay in place and properly cure, movement of the sealant can cause the sealant to leak.

SUMMARY OF THE INVENTION

According to the invention, there is provided an improved material for sealing leaks in water conveyance systems, the material comprising a porous hydrophilic rubber and a polyurethane resin impregnated into the pores of the porous hydrophilic rubber.

The polyurethane resin is preferably a water reactive powder resin and includes toluene diisocyanate, triethylene glycol or hydroximethal propenediol.

The amount of polyurethane resin in the material is preferably between 10% to 90% of the total composition of the material. In a more preferred embodiment, the material comprises 40% polyurethane resin and 60% porous hydrophilic rubber.

Other features and advantages of the invention will be set forth in, or apparent from, the following detailed description of the preferred embodiments of the invention.

DESCRIPTION OF THE PREFERRED EMBODIMENTS

According to the invention, there is provided a sealing material for sealing low to high flow water leaks in water conveyance and control structures. As indicated above, the sealing material is particularly suitable for sealing water leaks in hard to access areas. The sealing material includes a porous hydrophilic rubber impregnated with a water reactive polyurethane resin. An important advantage of the invention is that when the sealing material comes into contact with water, the rubber and polyurethane swell therefore resulting in increased adhesion. In other words, the increased swelling causes the material to stick to adjacent material and overcomes the above identified deficiencies in the prior art.

Suitable hydrophilic rubbers are open cell or closed cell rubbers and these rubbers can be formed into different shapes and sizes depending on the desired application. In one preferred embodiment, the rubber is flaked into about ½ inch diameter flakes, or made into short pieces of string-like shapes. The hydrophilic rubber is preferably a water-swelling porous vulcanized chloropene rubber.

Polyurethanes used with the invention are preferably made by reacting a polyisocyanate with a polyol. The most preferred formulations include toluene diisocyanate, triethylene glycol, hydroximethal propenediol and the like and, in a preferred embodiment, are in the form of a dry powder.

One method of manufacturing the sealing material of the invention involves impregnating a powdered polyurethane resin into the pores of a porous composition of hydrophilic rubber. The preferred amount of polyurethane resin ranges from 10% to 90% of the total composition. The most preferred composition of the sealing material contains 40% polyurethane resin powder and 60% porous hydrophillic rubber. The composition thus formed is then cut into a size and shape which is appropriate for sealing the particular leak in question. Two particularly preferred forms of the material composition of the invention which are suitable for most leaks are ¼ inch diameter pellets and thick thread-sized pieces 1 to 3 inches long.

Although the invention has been described in detail with respect to preferred embodiments thereof, it will be apparent to those skilled in the art that variations and modifications can be effected in these embodiments without departing from the spirit and scope of the invention.

We claim:

1. A material for sealing liquid leaks in conveyance systems, said material comprising:
    a porous hydrophilic rubber; and
    a water reactive polyurethane resin impregnated into the pores of said porous hydrophilic rubber.

2. The material as claimed in claim 1, wherein said polyurethane resin comprises a water reactive powder resin.

3. The material as claimed in claim 1, wherein said polyurethane resin includes toluene diisocyanate.

4. The material as claimed in claim 1, wherein said polyurethane resin includes triethylene glycol.

5. The material as claimed in claim 1, wherein said polyurethane resin includes hydroximethal propenediol.

6. The material as claimed in claim 1, wherein the amount of said polyurethane resin in the material is between 10% to 90% of the total composition of the material.

7. The material as claimed in claim 1, wherein said material comprises 40% polyurethane resin and 60% porous hydrophilic rubber.

8. The material as claimed in claim 1 wherein said material comprises a pellet.

9. The material as claimed in claim 8 wherein said pellet has a diameter of one-fourth inch.

10. The material as claimed in claim 1 wherein said material comprises a string-like element.

11. The material as claimed in claim 10 wherein said element is from one to three inches long.

12. The material as claimed in claim 1 wherein said material comprises a plurality of flakes.

13. A sealing material for sealing of a water leak in a water conveyance system caused by a hole in the conveyance system, said sealing material comprising a sealing element of a size and shape adapted to be plugged into a hole producing a leak in the water conveyance system and said sealing element comprising:
    a porous hydrophilic rubber; and
    a water reactive polyurethane resin impregnated into the pores of said porous hydrophilic rubber such that when said material of said sealing element comes into contact with water, the hydrophilic rubber and the water reactive polyurethane resin swell to thereby cause the material to adhere to portions of the water conveyance system defining the hole producing the leak and to thereby seal the leak.

14. A sealing element for sealing liquid leaks in liquid conveyance systems, said sealing element comprising a material comprising:
   a porous hydrophilic rubber; and
   a water reactive polyurethane resin impregnated into the pores of said porous hydrophilic rubber, and
   said sealing element being of a size and shape adapted to enable the sealing element to be plugged into a hole in the liquid conveyance system.

15. An element as claimed in claim 14 wherein said element comprises a pellet.

16. An element as claimed in claim 14 wherein said element comprises a string-like piece.

17. An element as claimed in claim 14 wherein said element comprises a flake.

* * * * *